UNITED STATES PATENT OFFICE.

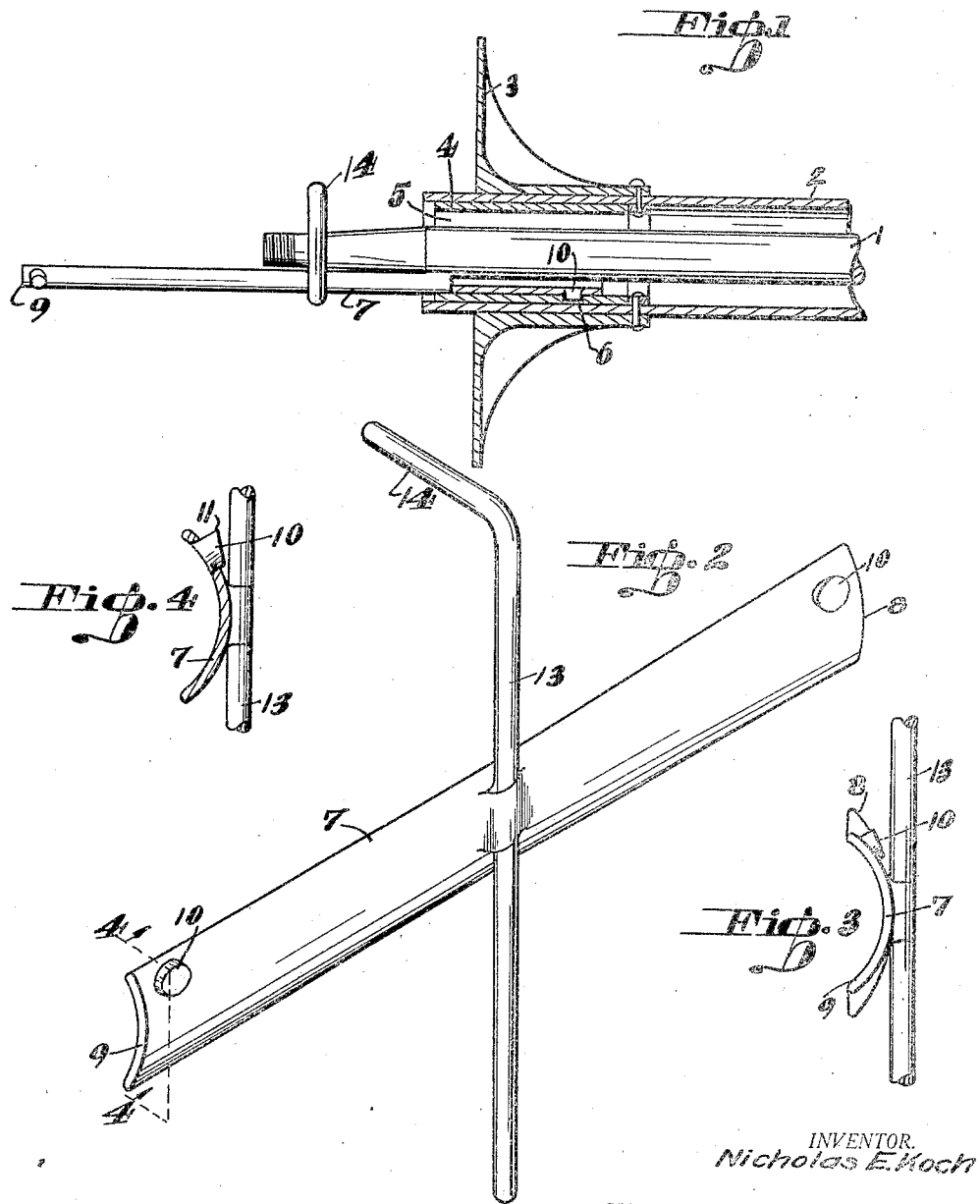

NICHOLAS E. KOCH, OF LOS ANGELES, CALIFORNIA.

SLEEVE-PULLER.

1,382,838.     Specification of Letters Patent.     Patented June 28, 1921.

Application filed April 29, 1920. Serial No. 377,585.

*To all whom it may concern:*

Be it known that I, NICHOLAS E. KOCH, a citizen of the United States, residing at Los Angeles, in the county of Los Angeles and State of California, have invented new and useful Improvements in Sleeve-Pullers, of which the following is a specification.

This invention is a sleeve puller adapted to be employed for engaging and pulling the usual sleeve from the axle housing of the axle of an automobile. It is the object of the invention to provide an extremely simple but efficient tool by means of which sleeves of various sizes may be engaged and readily removed by twisting the tool and pulling upon the same. The invention will be readily understood from the following description of the accompanying drawings in which:

Figure 1 is a longitudinal section through the end of the axle of an automobile showing the sleeve puller in operative position.

Fig. 2 is a perspective view of the sleeve puller.

Fig. 3 is an end view of the same.

Fig. 4 is a transverse section on the line 4—4 of Fig. 2.

The improved sleeve puller is employed for removing the sleeve from an axle comprising the axle shaft 1, and axle housing 2 surrounding the axle shaft and having the axle brake housing 3 riveted thereto. The sleeve which the tool is adapted to engage and withdraw from the axle housing consists of the usual longitudinally split sleeve 4 received within the end of the axle housing and spaced from the axle shaft to provide a space 5 for the usual bearings for the axle.

When it is desired to remove the sleeve from the axle housing the wheel and brake drum are removed and the bearings for the axle shaft are also removed leaving the space 5 into which the sleeve puller may be inserted to engage the usual opening 6 extending through the sleeve.

The improved sleeve puller is shown as comprising an elongated strip 7 of suitable metal which, preferably, tapers in width from its end 8 toward its end 9. The strip is transversely curved and the curvature of the end 9 is an arc of a circle of less diameter than the arc of the circle forming the curvature of the end 8 of the strip. By this construction when a sleeve of relatively large diameter is to be pulled, the end 8 of the strip 7 will be inserted in the axle housing and when a sleeve of relatively small diameter is to be pulled the opposite end 9 of the strip will be inserted in the axle housing so that the proper end of the strip may be employed with various sizes of sleeves to insure the end of the strip fitting snugly against the inner surface of the sleeve.

Lugs 10 project laterally from the convex surface of strip 7 adjacent the respective ends thereof, these lugs being arranged to engage in the opening 6 in the sleeve when the respective ends of the strip are inserted in the axle housing. The lugs 10 may be inserted in suitable apertures formed through the strip 7 and suitably riveted in position. The ends of the lugs, preferably, taper to one of the edges thereof as shown at 11 to form ends upon the lugs which may be readily inserted in the opening 6. A handle is provided for withdrawing the puller from the axle housing after a lug of the puller has engaged the sleeve, this handle being also arranged to permit of the puller being twisted as it is withdrawn in order to more readily slide the sleeve from the axle housing. The handle is shown as a rod 13 extending crosswise of the strip 7, preferably, midway thereof and is suitably secured to the convex surface of the strip 7. In order to more readily grasp the handle 13, the end 14 thereof may be angularly disposed relative to the main portion of the handle.

The construction as thus described provides an extremely simple but efficient tool which may be readily inserted in an axle housing so as to engage the sleeve therein by the lug formed upon the tool, the sleeve being then readily removed from the axle housing by withdrawing the tool with a twisting motion. By making the ends of the tool of different sizes, different sized sleeves may be readily engaged by the tool.

It will be obvious that various changes may be made in the construction as thus described without departing from the spirit of the invention.

What is claimed is:

1. A sleeve puller having means for engaging an opening formed in the sleeve, said puller having transversely spaced openings and a handle extending across said puller for withdrawing the puller and received through said openings and the sleeve engaged thereby.

2. A sleeve puller comprising an elongated strip having a handle extending crosswise thereof intermediate of its ends, and lugs projecting from the respective ends of said strip, either of said lugs being arranged to engage in an opening in the sleeve.

3. A sleeve puller comprising an elongated strip transversely curved upon arcs of circles of different diameters at the respective ends of said elongated strip, and means upon the respective ends of said strip for engaging an opening in the sleeve.

4. A sleeve puller comprising an elongated strip tapering in width from end to end and of increasing transverse curvature toward its narrow end, and means upon the respective ends of said strip for engaging an opening in the sleeve.

5. A sleeve puller having a lug projecting therefrom adjacent its end, the end of said lug depending toward one edge thereof so that the lug may be readily received within an opening in the sleeve.

In testimony whereof I have signed my name to this specification.

NICHOLAS E. KOCH.